United States Patent
Abdulhamid et al.

(10) Patent No.: US 12,421,445 B1
(45) Date of Patent: Sep. 23, 2025

(54) CHITOSAN ACETATE SALT POLYMER FOR ENHANCED OIL RECOVERY APPLICATIONS

(71) Applicant: King Fahd University of Petroleum and Minerals, Dhahran (SA)

(72) Inventors: Mahmoud Atef Abdulhamid, Dhahran (SA); Sivabalan Sakthivel, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/220,855

(22) Filed: May 28, 2025

Related U.S. Application Data

(60) Provisional application No. 63/733,361, filed on Dec. 12, 2024.

(51) Int. Cl.
   *C09K 8/588* (2006.01)
   *E21B 43/16* (2006.01)

(52) U.S. Cl.
   CPC .............. *C09K 8/588* (2013.01); *E21B 43/16* (2013.01)

(58) Field of Classification Search
   CPC ...................................... C09K 8/508
   See application file for complete search history.

(56) References Cited

U.S. PATENT DOCUMENTS 4,532,052 A * 7/1985 Weaver ................. C09K 8/508 507/923
2007/0125714 A1 6/2007 Reddy
(Continued)

OTHER PUBLICATIONS

Agatha Densy dos Santos Francisco, et al., "Chitosan derivatives as surfactant carriers for enhanced oil recovery—Experimental and molecular dynamic evaluations of polymer-surfactant interactions", Colloids and Surfaces A: Physicochemical and Engineering Aspects, vol. 671, May 15, 2023, 131644, Excerpts only, 7 pages.
(Continued)

*Primary Examiner* — William D Hutton, Jr.
*Assistant Examiner* — Avi T Skaist
(74) *Attorney, Agent, or Firm* — Oblon, McClelland, Maier &Neustadt, L.L.P.

(57) ABSTRACT

A method of recovering oil from a subterranean geological formation includes injecting a solution including salt water and a chitosan acetate salt polymer into the subterranean geological formation and concurrently recovering oil from a production well in the subterranean geological formation, where the chitosan acetate salt polymer has a structure according to the formula

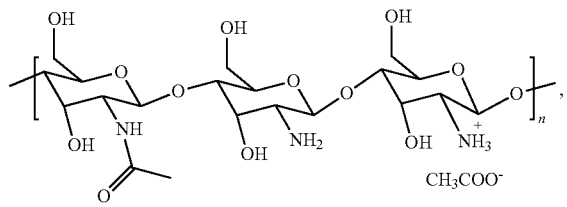

and where the chitosan acetate salt polymer alters the wettability of the subterranean geological formation. Further, the concentration of chitosan acetate salt polymer in the solution is in a range from 1 to 1,000 ppm and the contact angle of the solution on a formation surface is reduced by greater than or equal to 25% compared to a solution including salt water.

20 Claims, 13 Drawing Sheets

(56) References Cited

U.S. PATENT DOCUMENTS

| | | |
|---|---|---|
| 2013/0098618 A1 | 4/2013 | Braganza et al. |
| 2016/0230072 A1 | 8/2016 | Reddy et al. |
| 2016/0251564 A1 | 9/2016 | Gamage et al. |
| 2016/0264846 A1* | 9/2016 | Bennetzen .............. E21B 43/20 |
| 2021/0179911 A1 | 6/2021 | Jamison et al. |

OTHER PUBLICATIONS

Muhammad Taufiq Fathaddin, et al., "The Use of Natural Polymers to Enhance Oil Recovery", E3S Web of Conferences, vol. 500, 03025 (2024), 8 pages.

* cited by examiner

CHITOSAN ACETATE SALT POLYMER FOR ENHANCED OIL RECOVERY APPLICATIONS

CROSS REFERENCE TO RELATED APPLICATION

This application claims the benefit of U.S. Provisional Application No. 63/733,361, filed Dec. 12, 2024, which is incorporated herein by reference in its entirety.

STATEMENT REGARDING PRIOR DISCLOSURE BY THE INVENTORS

Aspects of the present disclosure are described in Sakthivel, et al., "Water-soluble chitosan polymer for enhanced oil recovery in the carbonate reservoir" published in Volume 281, International Journal of Biological Macromolecules, which is incorporated herein by reference in its entirety.

STATEMENT OF ACKNOWLEDGEMENT

Support provided by the College of Petroleum Engineering and Geosciences, King Fahd University of Petroleum and Minerals, Saudi Arabia, is gratefully acknowledged.

BACKGROUND

Technical Field

The present disclosure is directed to an oil recovery technique and, more particularly, towards recovering oil from a subterranean geological formation by injecting a chitosan acetate-based salt polymer solution into the subterranean formation.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

Numerous surfactants, nanoparticles and polymers have been developed and utilized for enhanced oil recovery applications, irrespective of their environmental impact. Most of these oilfield chemicals were prepared through multi-step processes from fossil-based starting materials using hazardous solvents. However, there is a desire to advance eco-friendly and sustainable materials to reduce $CO_2$ emissions and enhance the sustainability of oil production.

Chemical enhanced oil recovery (cEOR) is one of the most promising methods in unconventional oil reservoirs to improve oil displacements for untapped oils (residual, trapped or bypassed fraction of oils) even after performing the primary and secondary recovery processes. Improving the mobility in such an oil fraction requires a thorough knowledge of the capillarity, wettability, interfacial tension (IFT), and relative permeability of the reservoir. Wettability plays a huge role as it determines how a fluid interacts on a solid surface, and it measures the relative adhesion (affinity) of two immiscible fluids that are present in the rock matrix. It mainly affects the oil/water fluids flow and their distributions in the porous media. Although measuring the rock-oil-water contact angle is a macroscopic approach, it remains the most widely used method in the industry for quick wettability assessment. Approximately two-thirds of oil reservoirs are carbonate formations, which are typically complex, heterogeneous, and exhibit strong oil-wet characteristics. In such reservoirs, conventional waterflooding often leads to early water breakthroughs and poor oil recovery. However, by altering the physicochemical interactions within the rock-oil-water system, it is possible to shift the wettability of these formations from strongly oil-wet to water-wet or intermediate-wet. This modification enhances spontaneous water imbibition into the rock matrix, thereby improving oil recovery. In general, the injection of chemicals like surfactants, nanofluids and polymers is employed in cEOR to alter the original wettability of the reservoirs and thus to improve the oil displacements. Still, the efficiency of these chemicals is subject to change as there are changes in the oil composition, rock lithology, fluid density/viscosity, rock roughness, surface chemistry, temperature, pressure, and salinity. Moreover, wettability modification in such complex and harsh reservoirs involves many challenges because of their extreme salinity and high-temperature conditions, in addition to their mineralogical complexity and reservoir heterogeneity. In general, the Saudi Arabian reservoirs are harsh saline environments, which include 240 thousand parts per million (kppm) connate brine salinity with a huge amount of both mono- and divalent ions. Conventional chemicals often get adsorbed in the near-wellbore due to their unfavorable charges and it results in poor deliverability due to diffusivity issues. In addition, they also fail to sustain in these harsh environments as they are degraded and/or precipitated in the reservoir. This leads to severe formation damage as chemicals plug the pore throats and therefore affect fluid flow in the reservoirs.

Recently, considerable attention has been directed toward developing and formulating chemicals capable of withstanding harsh reservoir conditions and enhancing oil recovery. Examples include functionalized nanoparticles, gemini surfactants, and ionic liquids, which have been employed in enhanced chemical oil cEOR. Despite their improved performance, concerns regarding field-scale application persist, as these materials are often expensive and challenging to scale up due to complex, multi-step synthesis processes. Moreover, their production typically relies on fossil fuel-derived feedstocks, raising environmental sustainability issues.

To improve the sustainability of the chemicals used in cEOR, several studies on utilizing green extracts were reported. For instance, Shahri et al. reported oil recovery performance of 7%-25.6% using zizyphus spina-christy extracts at a concentration range between 37,000 parts per million (ppm) and 80,000 ppm. Although this oil recovery is considered acceptable, the required concentration of the extract is very high. Similarly, mulberry leaves and *Glycyrrhiza glabra* extracts demonstrated oil recovery between 16.5% and 22.7% at concentrations between 10,000 ppm and 60,000 ppm. Furthermore, Sakthivel et al. reported the oil recovery performance in the carbonate reservoir for a newly developed citric acid-based chemicals. The resulting chemicals demonstrated oil recovery of 15% and 19% at concentration of 200 ppm and 500 ppm, respectively. Notably, the recovery of oil was slightly lower compared to the green extracts, but the concentration used was also lower, which is favored on industrial scale.

Lately, an increased attention has been given to green and bio-derived polymers for upstream applications due to their sustainability, low toxicity, and biodegradability. For instance, modified chitosan was explored due to its unique chemical structure, which is rich in polar groups such as hydroxyl groups and amines and showed promising performance. For instance, amphiphilic chitosan copolymer (PAMCS) prepared by free radical polymerization demonstrated 16.7% oil recovery at a concentration of 1500 ppm [Pu, W., et al., Amphiphilically modified chitosan copolymer for enhanced oil recovery in harsh reservoir condition, *Journal of Industrial and Engineering Chemistry*, Volume 37, 2016, pages 216-223]. Similarly, trimethyl chitosan (TMC) and trimethyl chitosan hydrophobized with myristoyl chloride (TMC-C14) were developed and investigated for enhanced oil recovery. TMC-14 and TMC exhibited an enhanced oil recovery of 12.3% and 18.8%, respectively, at a concentration of 5000 ppm [dos Santos Francisco, A., et al. Wettability alteration of oil-wet carbonate rocks by chitosan derivatives for application in enhanced oil recovery, *J Appl Polym Sci.*, 2021, 138, e50098]. It is notable that, for oil recovery applications, the industry prefers materials that are effective at low concentrations and may be easily scaled up with minimal synthetic steps.

Each of the aforementioned chemicals suffer from one or more drawbacks hindering their adoption. Accordingly, one object of the present disclosure to develop a chemical that may circumvent the drawbacks, such as, low biodegradability, high toxicity, high-cost, complexity of production, and high concentrations required for adequate performance, of the materials known in the art.

SUMMARY

In an exemplary embodiment, a method of recovering oil from a subterranean geological formation is described. The method includes injecting a solution including salt water and a chitosan acetate salt polymer into the subterranean geological formation. Further the method includes concurrently recovering oil from a production well in the subterranean geological formation, where the chitosan acetate salt polymer has a structure according to the formula

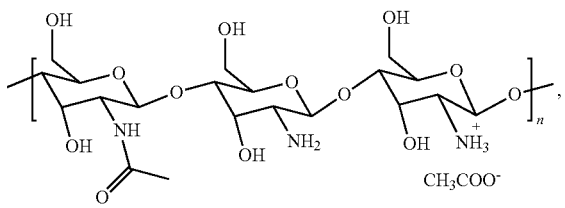

where the chitosan acetate salt polymer alters the wettability of the subterranean geological formation. Further, the concentration of chitosan acetate salt polymer in the solution is in a range from 1 part per million (ppm) to 1,000 ppm, and where the contact angle of the solution on a formation surface is reduced by greater than or equal to 25% compared to a solution including salt water.

In some embodiments, the concentration of chitosan acetate salt polymer in the solution is in a range from 10 ppm to 1,000 ppm.

In some embodiments, the concentration of chitosan acetate salt polymer in the solution is in a range from 50 ppm to 350 ppm.

In some embodiments, the concentration of chitosan acetate salt polymer in the solution is in a range from 75 ppm to 150 ppm.

In some embodiments, the concentration of chitosan acetate salt polymer in the solution is 100 ppm.

In some embodiments, the contact angle of the solution on a formation surface of the subterranean geological formation is reduced by greater than or equal to 35% compared to a solution including salt water.

In some embodiments, the contact angle of the solution on a formation surface of the subterranean geological formation is reduced by greater than or equal to 45% compared to a solution including salt water.

In some embodiments, the contact angle of the solution on a formation surface of the subterranean geological formation is reduced by greater than or equal to 50% compared to a solution including salt water.

In some embodiments, the interfacial tension between the solution and the formation surface of the subterranean geological formation is reduced by greater than or equal to 40% compared to a solution including salt water.

In some embodiments, the interfacial tension between the solution and the formation surface of the subterranean geological formation is reduced by greater than or equal to 60% compared to a solution including salt water.

In some embodiments, the interfacial tension between the solution and a formation surface of the subterranean geological formation is reduced by greater than or equal to 80% compared to a solution including salt water.

In some embodiments, the interfacial tension between the solution and a formation surface of the subterranean geological formation is reduced by greater than or equal to 90% compared to a solution including salt water.

In some embodiments, the solution has a total oil recovery of greater than or equal to 30% in a spontaneous imbibition test using an oil-wet carbonate reservoir rock sample.

In some embodiments, the solution has a total oil recovery of greater than or equal to 35% in a spontaneous imbibition test using an oil-wet carbonate reservoir rock sample.

In some embodiments, the solution has a total oil recovery of greater than or equal to 40% in a spontaneous imbibition test using an oil-wet carbonate reservoir rock sample.

In some embodiments, the solution has a total oil recovery of greater than or equal to 43% in a spontaneous imbibition test using an oil-wet carbonate reservoir rock sample.

In some embodiments, the oil-wet carbonate reservoir rock sample is Indiana limestone.

In some embodiments, the solution has an additional oil recovery of greater than or equal to 7% following saltwater displacement in a coreflood oil displacement test.

In some embodiments, the solution has an additional oil recovery of greater than or equal to 10% following saltwater displacement in a coreflood oil displacement test.

In some embodiments, the solution has an additional oil recovery of greater than or equal to 14% following saltwater displacement in a coreflood oil displacement test.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
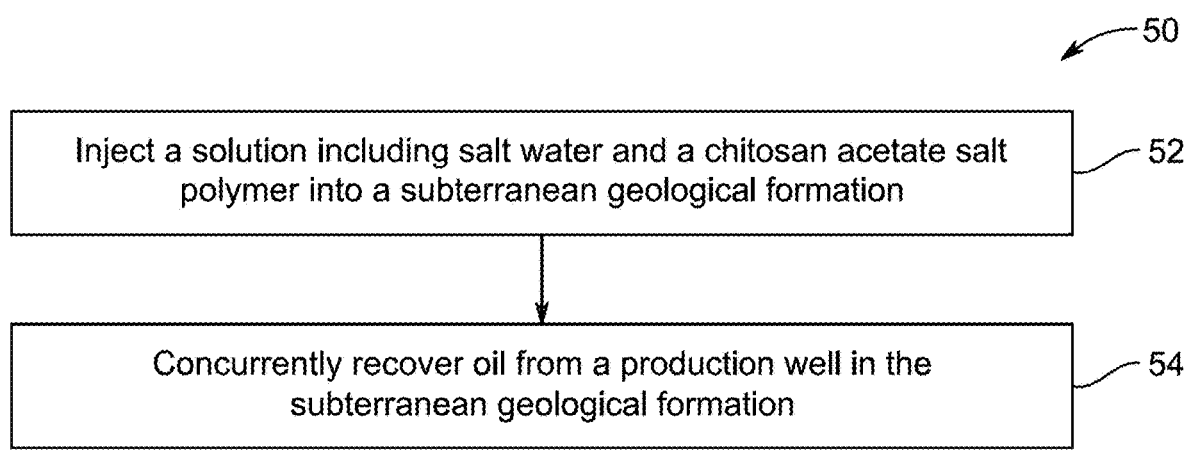
FIG. 1 is a schematic flowchart of a method of recovering oil from a subterranean geological formation, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and lower limit values, it should be understood that any ranges obtainable by combining any upper limit or preferable value with any lower limit or preferable value are also specifically disclosed, irrespective of whether the obtained ranges are clearly mentioned in the context.

As used herein, the term 'room temperature' refers to a temperature range of '25 degrees Celsius (° C.)±3° C. in the present disclosure.

A weight percent of a component, unless specifically stated to the contrary, is based on the total weight of the formulation or composition in which the component is included. For example, if a particular element or component in a composition or article is said to have 5 percent by weight (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'subterranean geological formation' refers to a naturally occurring layer of rock or sediment located beneath the Earth's surface, which may contain fluids such as oil, gas, or water.

As used herein, the term 'production well' refers to a borehole drilled into a subsurface reservoir for the purpose of extracting hydrocarbons or other fluids.

As used herein, the term 'polymer' refers to a macromolecule composed of repeating structural units, which may be used to modify fluid properties in subsurface environments.

As used herein, the term 'oil-wet carbonate reservoir' refers to a type of subsurface reservoir composed primarily of carbonate rock, where the rock surfaces preferentially retain oil rather than water.

As used herein, the term 'spontaneous imbibition test' refers to a laboratory procedure used to evaluate the ability of a porous rock sample to absorb a fluid without the application of external pressure.

As used herein, the term 'contact angle' refers to the angle formed at the junction where a liquid interface meets a solid surface, indicating the wettability of the solid by the liquid.

As used herein, the term 'interfacial tension' refers to the force per unit length existing at the boundary between two immiscible fluids, such as oil and water.

As used herein, the term 'total oil recovery' refers to the cumulative amount of oil extracted from a reservoir relative to the original oil in place.

FIG. 1 illustrates a flow chart of a method 50 of recovering oil from a subterranean geological formation, which is an aspect of the present disclosure. The subterranean geological formation may include, but is not limited to, a depleted oil reservoir, a depleted gas reservoir, a sour reservoir, a hydrocarbon-bearing subterranean formation, a saline formation, or an un-minable coal bed. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a solution including salt water and a chitosan acetate salt polymer into the subterranean geological formation. The injecting may be achieved through any typical oilfield mechanism, such as pumping into a wellbore. In some embodiments, suitable examples of salts in the salt water may include sodium chloride (NaCl), sodium bicarbonate ($NaHCO_3$), sodium sulfate ($Na_2SO_4$), magnesium chloride ($MgCl_2$), potassium chloride (KCl), potassium sulfate ($K_2SO_4$), potassium bicarbonate ($KHCO_3$), calcium sulfate ($CaSO_4$), calcium nitrate ($Ca(NO_3)_2$), magnesium sulfate ($MgSO_4$), magnesium nitrate ($Mg(NO_3)_2$), magnesium acetate ($Mg(CH_3CO_2)_2$), sodium carbonate ($Na_2CO_3$), disodium hydrogen phosphate ($Na_2HPO_4$), sodium nitrate ($NaNO_3$), potassium bicarbonate ($KHCO_3$), magnesium bicarbonate ($Mg(HCO_3)_2$), iron (II) chloride ($FeCl_2$), iron (III) chloride ($FeCl_3$), iron (II) sulfate ($FeSO_4$), potassium sulfate ($K_2SO_4$), barium sulfate ($BaSO_4$), lithium chloride (LiCl), lithium sulfate ($Li_2SO_4$), lithium nitrate ($LiNO_3$), and $CaCl_2$. In some embodiments, the salt water may include one or more salts selected from a group including NaCl, $NaHCO_3$, $NaSO_4$, $MgCl_2$, and $CaCl_2$. In some embodiments, the salt water includes various dissolved salts, with typical concentrations expressed in grams per liter (g/L) as follows: sodium chloride at 41.042 g/L, calcium chloride dihydrate at 2.385 g/L, magnesium chloride hexahydrate at 17.645 g/L, sodium sulfate at 6.343 g/L, and sodium bicarbonate at 0.165 g/L.

In one or more embodiments, the chitosan acetate salt polymer has a structure according to the formula

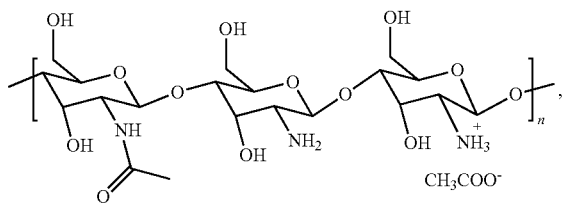

In one or more embodiments, the chitosan acetate salt polymer alters the wettability of the subterranean geological formation. In one or more embodiments, the concentration of chitosan acetate salt polymer in the solution is in a range from 0.5 to 10,000 parts per million (ppm), preferably 1 to 1,000 ppm, preferably 10 to 1,000 ppm, preferably 5 to 900 ppm, preferably 10 to 800 ppm, preferably 20 to 700 ppm, preferably 30 to 600 ppm, preferably 40 to 500 ppm, preferably 50 to 400 ppm, preferably 60 to 300 ppm, preferably 70 to 250 ppm, preferably 75 to 200 ppm, preferably 80 to 180 ppm, preferably 85 to 160 ppm, preferably 90 to 150 ppm, preferably 92 to 140 ppm, preferably 94 to 130 ppm, preferably 95 to 120 ppm, preferably 96 to 115 ppm, preferably 97 to 110 ppm, preferably 98 to 108 ppm, preferably 98.5 to 106 ppm, preferably 99 to 104 ppm, preferably 99.2 to 103 ppm, preferably 99.4 to 102 ppm, preferably 99.6 to 101 ppm, preferably 99.7 to 100.8 ppm, preferably 99.8 to 100.6 ppm, preferably 99.85 to 100.4 ppm, preferably 99.9 to 100.2 ppm, preferably 99.95 to 100.1 ppm, preferably 99.98 to 100.05 ppm. In one or more embodiments, the concentration of chitosan acetate salt polymer in the solution is in a range from 50 to 350 ppm. In one or more embodiments, the concentration of chitosan acetate salt polymer in the solution is in a range from 75 to 150 ppm. In a preferred embodiment, the concentration of chitosan acetate salt polymer in the solution is 100 ppm. Possible additives to the chitosan acetate salt polymer for injection into the subterranean geological formation may include partially hydrolyzed polyacrylamide (PHPA), xanthan gum, guar gum, hydrolyzed polyacrylamide copolymers (HPAM), carboxymethyl cellulose (CMC), alginates, starch-based polymers, and succinoglycan.

In some embodiments, the solution may optionally include any number of suitable additives. Exemplary additives include, but are not limited to, weighting agents, emulsifiers, viscosities, fluid-loss control agents, bridging agents, pH controlling agents, defoamers, clay stabilizers, anti-scalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, and the like. A person of ordinary skill in the art, with the benefit of this disclosure, will recognize the types and suitable amounts of additives that may be included in the aqueous solution for a particular application, without undue experimentation.

At step 54, the method 50 includes concurrently recovering oil from a production well in the subterranean geological formation. In some embodiments, oil is concurrently recovered during low-salinity water flooding to alter reservoir wettability. In some embodiments, oil is concurrently recovered while a gas such as $CO_2$ or nitrogen is injected to maintain reservoir pressure. In some embodiments, oil is concurrently recovered during cyclic solvent injection to mobilize residual hydrocarbons. In some embodiments, oil is concurrently recovered while a surfactant solution is introduced to reduce interfacial tension. In some embodiments, oil is concurrently recovered through a production well while adjacent wells inject fluids for pressure support. In some embodiments, oil is concurrently recovered while applying electromagnetic heating to reduce oil viscosity. In some embodiments, oil is concurrently recovered during foam injection or after gel formation to block high-permeability zones. In some embodiments, oil is concurrently recovered while monitoring formation parameters in real-time to enhance recovery. In some embodiments, oil is concurrently recovered while nanoparticle-containing fluids are injected to enhance oil displacement efficiency. In a preferred embodiment, oil is concurrently recovered while injecting the solution including the chitosan acetate salt polymer.

In some embodiments, a downhole pump may be used to lift produced fluids to the surface during concurrent recovery. In some embodiments, a surface separator is employed to separate oil, gas, and water phases at the wellhead. In some embodiments, injection pumps are used to deliver polymer, water, or gas into the formation for enhanced recovery. In some embodiments, a wellhead control assembly regulates flow and pressure during concurrent injection and production. In some embodiments, sensors and monitoring tools are installed downhole to measure pressure, temperature, and fluid composition. In some embodiments, a coiled tubing system may be used to deliver treatment fluids while allowing simultaneous oil production. In some embodiments, a production tubing string may be equipped with flow control valves for managing multi-phase fluid flow. In some embodiments, a chemical injection system may be used to deliver surfactants, polymers, or scale inhibitors into the well. In some embodiments, a gas compressor may be utilized to inject gas for pressure maintenance while oil may be concurrently recovered. In some embodiments, a multiphase pump may be used to handle the combined flow of oil, gas, and water from the production well.

In one or more embodiments, the contact angle of the solution on a formation surface of the subterranean geological formation is reduced by greater than or equal to 10%, preferably 25%, preferably 30%, preferably 35%, preferably 40%, preferably 45%, preferably 50% compared to a solution consisting of salt water.

In one or more embodiments, the interfacial tension between the solution and a formation surface of the subterranean geological formation is reduced by greater than or equal to 40%, preferably 45%, preferably 50%, preferably 55%, preferably 60%, preferably 65%, preferably 70%, preferably 75%, preferably 80%, preferably 85%, preferably 90% compared to a solution consisting of salt water. In one or more embodiments, the interfacial tension between the solution and a formation surface of the subterranean geological formation is reduced by greater than or equal to 90%, preferably 91%, preferably 92%, preferably 93% compared to a solution consisting of salt water.

In one or more embodiments, the solution has a total oil recovery of greater than or equal to 30%, preferably 35%, preferably 40%, preferably 43% in a spontaneous imbibition test using an oil-wet carbonate reservoir rock sample. In one or more embodiments, the solution has a total oil recovery of greater than or equal to 43%, preferably 43.1%, preferably 43.2%, preferably 43.3%, preferably 43.4%, preferably 43.5%, preferably 43.6%, preferably 43.7% in a spontaneous imbibition test using an oil-wet carbonate reservoir rock sample.

In one or more embodiments, the oil-wet carbonate reservoir rock sample is Indiana limestone. In one or more embodiments, the solution has an additional oil recovery of greater than or equal to 7%, preferably 8%, preferably 9%, preferably 10%, preferably 11%, preferably 12%, preferably 13%, preferably 14% following saltwater displacement in a coreflood oil displacement test. In one or more embodiments, the solution has an additional oil recovery of greater than or equal to 14%, preferably 14.1%, preferably 14.2%, preferably 14.3%, preferably 14.4%, preferably 14.5%, preferably 14.6%, preferably 14.7% following saltwater displacement in a coreflood oil displacement test.

EXAMPLES

The following examples demonstrate a chitosan salt acetate polymer as described herein. The examples are provided solely for illustration and are not to be construed as limitations of the present disclosure, as many variations thereof are possible without departing from the spirit and scope of the present disclosure.

Example 1: Materials

Chitosan [Mn=190,000 dalton (Da)-310,000 Da], acetic acid (>99%) and cetrimonium bromide (CTAB) were purchased from Merck and used without further purification. α-olefin sulfonate (AOS) was received from Al-Biariq petrochemical industries Co. Ltd. Deionized water was collected as type II by Millipore (Milli-Q Academic).

Example 2: Synthesis of Chitosan Salt Polymer

Figure 2:
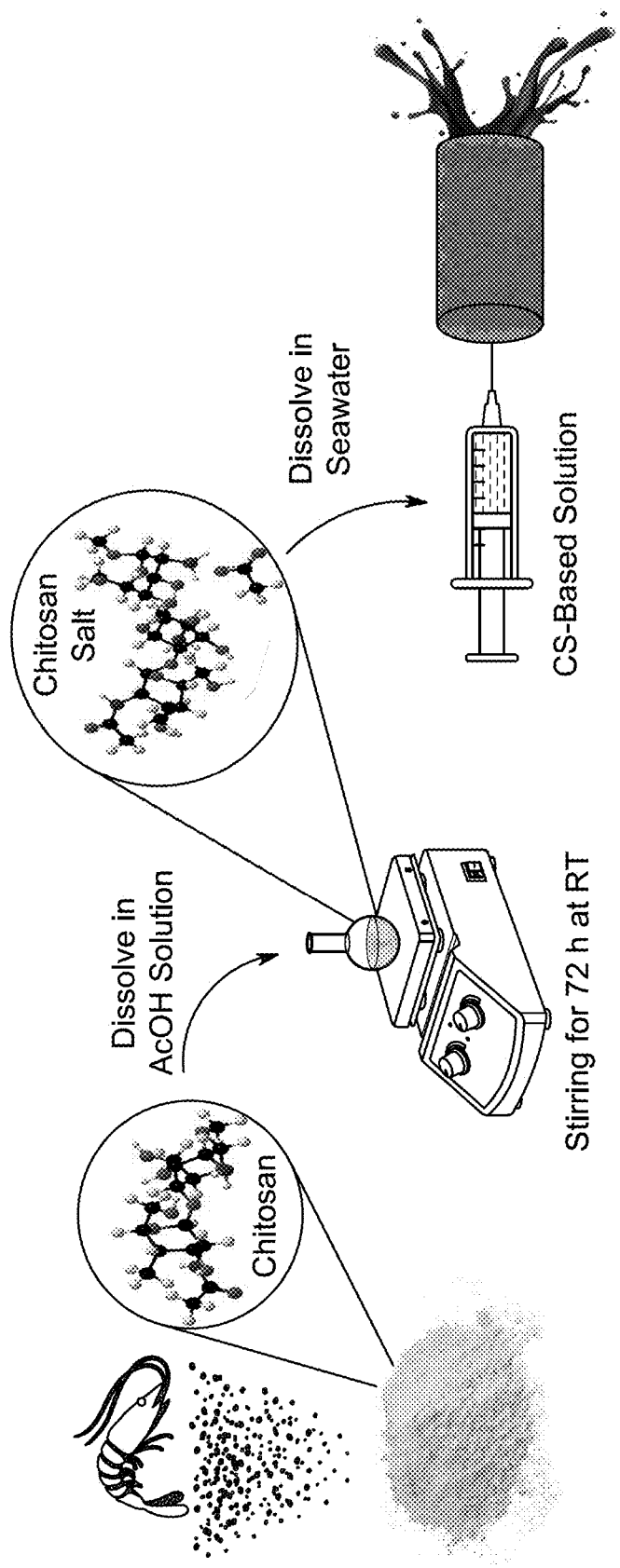
FIG. 2 is a schematic illustration for the synthesis of chitosan salt and its application in enhanced oil recovery, according to certain embodiments.
Figure 3:
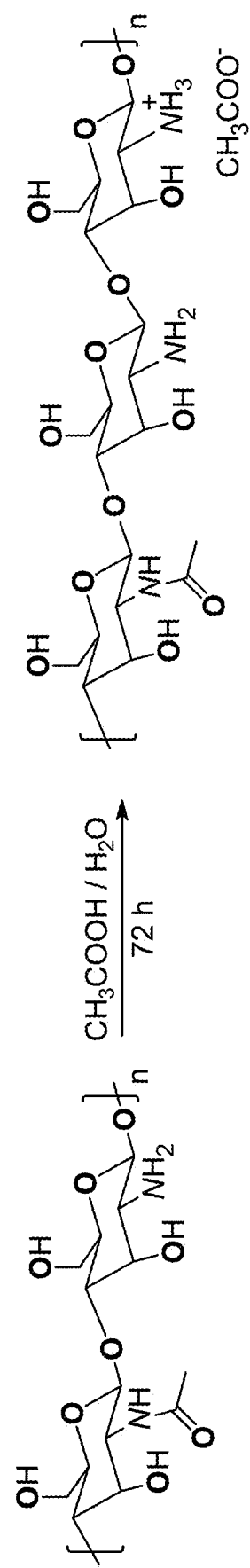
FIG. 3 is a schematic illustration showing synthesis of chitosan salt polymer at room temperature, according to certain embodiments.

Chitosan salt was prepared by dissolving 1 g of chitosan in 99.31 mL water and 0.693 mL acetic acid at room temperature for 72 hours, as shown in FIG. 3. Then the viscous solution was precipitated in acetone and the obtained product was filtered and dried at 100 degree celsius (° C.) for further characterization. The polymer was prepared in water in one-step from entirely green starting materials, as shown in FIG. 2.

Example 3: Polymer Characterization

The functional groups of the chitosan polymer were characterized by fourier transform-infrared (FT-IR) spectroscopy using a Bruker INVENIO Series IR spectrometer in the range of 400 wavenumber ($cm^{-1}$)-4000 $cm^{-1}$. The thermal stability of the chitosan salt was evaluated by thermal gravimetric analysis (TGA) using a TA instruments (Q600 SDT) in the range of 30° C. to 800° C. with a ramping speed of 10 degree celsius per minute (° C.·$min^{-1}$) under nitrogen atmosphere. The polymer morphology (amorphousness or crystallinity) and d-spacing were assessed by wide angle X-ray diffraction (WXRD) using a pananalytical diffractometer model Empyrean Alphal at 20 kilovolts (kV) with Cu Kα radiation source. The diffraction intensity was measured in the range of 2θ=4°-70° with a step size of 0.014° $s^{-1}$ (degree per second). The d-spacing was calculated using Bragg's law: nλ=2d sin θ, where n is an integer representing the order of diffraction, λ is the wavelength of the incident radiation, d is the spacing between the parallel atomic planes in the crystal, and θ is the angle of incidence.

Example 3: Polymer Characterization

The crude oil sample was collected from one of the Saudi Arabian formations with an American Petroleum Institute (API) gravity of 28.8°. It includes 50% aromatics, 36.2% saturates, 11% resins, and 2.8% asphaltenes at 25° C. The crude oil sample displayed density and viscosity of 0.87 kilogram per cubic meter (kg $m^{-3}$) and 15.1 centipoise (cp), respectively. Saudi Arabian reservoirs are complex and heterogenous formations that are high in salt. The connate water saturation of these formations is about 240 thousand parts per million (kppm) salt, which includes both mono- and divalent ions, where the injection brine used in the waterflooding is about 67 kppm. To mimic such an environment, both the formation water and seawater were formulated to represent both the connate water and injection water salinities, as shown in Table 1.

TABLE 1

Ionic composition of the formulated brine fluids.

| Salt | Seawater (SW) g L$^{-1}$ | Formation water (FW) g L$^{-1}$ |
|---|---|---|
| NaCl | 41.042 | 150.446 |
| CaCl$_2$•2H$_2$O | 2.385 | 69.841 |
| MgCl$_2$•6H$_2$O | 17.645 | 20.396 |
| Na$_2$SO$_4$ | 6.343 | 0.518 |
| NaHCO$_3$ | 0.165 | 0.487 |
| TDS (ppm) | 67,580 | 2,41,690 |

In this disclosure, the chitosan in sea water (SW) was studied at concentration of 0 ppm, 10 ppm, 100 ppm, and 1000 ppm. Prior to the experiments, the stability of the chitosan compound at high temperature (100° C.) and high salinity (67 kppm) conditions were evaluated and demonstrated no degradation or sedimentation.

Example 4: Wettability and Interfacial Tension Studies

Figure 4:
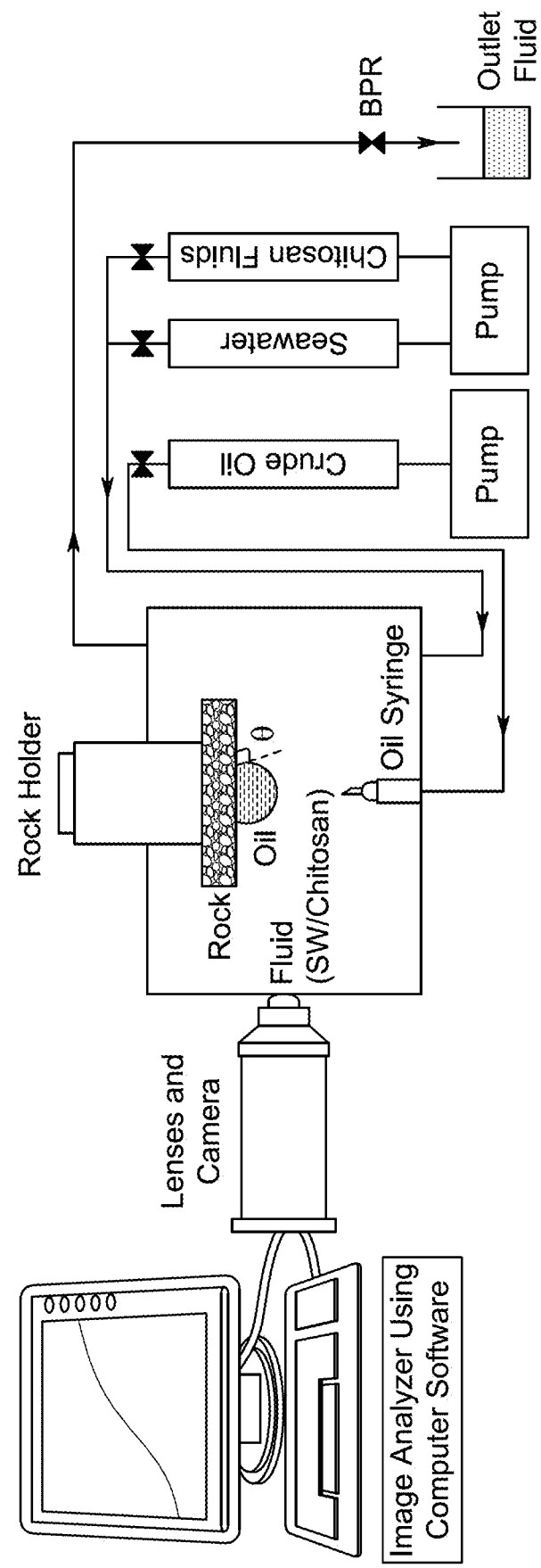
FIG. 4 is a schematic illustration of high temperature high pressure (HTHP) tensiometer, according to certain embodiments.

Wettability and oil displacement studies were performed using Indiana limestone outcrop core samples, as shown in Table 2. A dozen rock chips (disc-shaped rock slices) with 1" diameter and 35 mm thickness were prepared. Subsequently, samples with different dimensions were also prepared from the same source for the imbibition and coreflood experiments. All samples were cleaned using the Soxhlet extraction method and dried over at 100° C. for 2 days. Afterward, the petrophysical properties were measured. An IFT-700 interfacial tension meter (Vinci Technologies) was used to estimate the wettability of the rock sample by measuring the contact angle of the rock-oil-water system with and without additives. In addition, the oil-water IFT using the same instrument was also measured. The dried samples were vacuum saturated in the crude oil and aged (by soaking in an oil container) for two weeks at 100° C., to restore the reservoir wettability. FIG. 4 shows the schematic representation of the high temperature high pressure (HTHP) tensiometer. The inverted sessile drop method was applied, where the contact angle of the system was always measured through the denser phase (water) of the system. First, the cell was filled with the required test fluids—typically seawater (SW) or a chitosan solution at a specified concentration. The rock sample was then mounted in the core holder and subsequently submerged in the test solution within the cell. The system was then tuned for the required temperature and pressure and left for at least 1 to 2 hours to reach equilibrium. Next, a drop of oil was generated using the pump and needle positioned beneath the rock sample, and it was gently deposited onto the rock surface. Images were taken by a high-resolution camera, and the contact angle was calculated. The contact angle measurement was performed at different temperatures (25° C., 50° C., 75° C., and 100° C.), and pressures (14.7 pounds per square inch (psi), 1000 psi, 2000 psi, and 3000 psi) for different chitosan salt concentrations. Finally, the maximum possible oil drop in the bulk fluid was generated and used to measure the IFT using the pendant drop method.

TABLE 2

Petrophysical properties of the rock samples used for wettability measurements.

| | | | | | Permeability (mD) | |
|---|---|---|---|---|---|---|
| Rock type | Height (cm) | Width (cm) | Pore volume (mL) | Porosity (%) | Gas (He) | Brine (SW) |
| Indiana limestone | 0.35 | 2.5 | 0.13 | 12 | 55 | 38 |

Example 5: Spontaneous Imbibition and Nuclear Magnetic Resonance (NMR) Studies

Six spontaneous imbibition tests were conducted to assess the efficacy of the newly synthesized chitosan salt polymer for imbibing into the oil-wet carbonate reservoir and to quantify its contribution to the oil recovery. Six pieces of the Indiana limestone core sample with dimensions of 1.5" diameter and 2" length were used. First, the clean core plugs were vacuum saturated in the formation water (240 kppm) and petrophysical properties such as pore volume, porosity, and permeability (using coreflood setup) were measured. Afterwards, the samples were oil-saturated using the Ultra Rock Centrifuge (URC-628) at different speed ranges from 500 revolution per minute (rpm) to 14000 rpm for 48 hrs. The initial oil saturation ($S_{oi}$) and irreducible water saturation ($S_{wi}$) of the samples were acquired. The samples were then soaked in an oil container and aged for two weeks at 100° C. Afterward, the effective permeability of the aged sample was tested using the coreflood setup. After that, the spontaneous imbibition tests were performed by soaking these oil-wet carbonate samples into the individual Amott cells (Vinci Technologies; rated for 2 bar pressure, 120° C. temperature, 20±0.1 cc graduation for measuring the oil production), that was pre-filled with the corresponding test fluids. The entire setup was loaded into the oven and elevated the temperature to 100° C. and the oil production was recorded periodically. The tests were performed for a maximum of 50 days. As shown in Table 3, three different concentrations of chitosan salt polymer (i.e., 10 ppm, 100 ppm, and 1000 ppm in SW) were studied, subsequently a reference experiment in SW only was tested for comparison purposes. In addition, the two most used surfactants (i.e., AOS and CTAB at 500 ppm) were also tested for comparison purposes.

In continuation with the imbibition experiments, the real fluid distribution of the core samples was measured during the process of spontaneous imbibition using a low-field NMR (2.2 MHz Oxford GeoSpec 2 rock core analyzer). In this, the real-time imbibition capacity of the test fluids was monitored more accurately and the rate and overall efficacy to alter the wettability of the oil-wet core samples were estimated. A series of transverse relaxation time ($T_2$) distribution of the rock sample at different stages of the imbibition were performed in the following order: (i) after formation brine saturation, (ii) after oil-saturation and aging at $S_{wi}$, (iii) after 40 days of spontaneous imbibition. The Car-Purcell-Meiboom-Gill (CPMG) pulse sequence was used as the NMR logging service. In this, the same pulse sequence with a signal-to-noise ratio of 100 was used. It maintained the echo time as 0.1 ms, and a total of 25,000 echo number was obtained for the entire decay period. According to Brownstein and Tarr, 1979, the below equation was employed to acquire the $T_2$ distribution of the fluids in the porous media [Brownstein, K., et al., Importance of classical diffusion in NMR studies of water in biological cells, *Phys. Rev. A*, 19, 1979, 2446, which is incorporated herein by reference in its entirety]

$$\frac{1}{T_2} = \frac{1}{T_{2,bulk}} + \frac{1}{T_{2,surface}} + \frac{1}{T_{2,diffusion}} = \frac{1}{T_{2,bulk}} + \rho_2 \frac{S}{V} + \frac{1}{12} D \, (\gamma G t_E)^2 \quad (1)$$

where, $\rho_2$=surface relaxivity constant, S/V=surface-to-volume ratio, D=diffusion coefficient of fluid, $\gamma$=gyromagnetic ratio of hydrogen, G=internal magnetic field, $t_E$=echo time.

TABLE 3

List of spontaneous imbibition tests performed in this study and their petrophysical properties.

| Sample ID | L (cm) | D (cm) | φ (%) | k (mD) brine$_{fw}$ | k (mD) oil$_{swi}$ | Imbibition fluid |
|---|---|---|---|---|---|---|
| S1 | 4.91 | 3.75 | 15.2 | 24.9 | 6.9 | SW |
| S2 | 4.93 | 3.75 | 15.7 | 26.1 | 7.1 | AOS-500 ppm |
| S3 | 4.95 | 3.75 | 14.9 | 25.1 | 7.2 | CTAB-500 ppm |

TABLE 3-continued

List of spontaneous imbibition tests performed in this study and their petrophysical properties.

| Sample ID | L (cm) | D (cm) | φ (%) | k (mD) brine$_{fw}$ | k (mD) oil$_{swi}$ | Imbibition fluid |
|---|---|---|---|---|---|---|
| S4 | 4.92 | 3.75 | 15.3 | 28.1 | 7.8 | Chitosan-10 ppm |
| S5 | 4.91 | 3.75 | 15.5 | 26.2 | 7.3 | Chitosan-100 ppm |
| S6 | 4.93 | 3.75 | 15.1 | 24.9 | 7.1 | Chitosan-1000 ppm |

L = Length; D = Diameter; φ = Porosity; k = Permeability.

Example 6: Coreflood Oil Displacements

Figure 5:
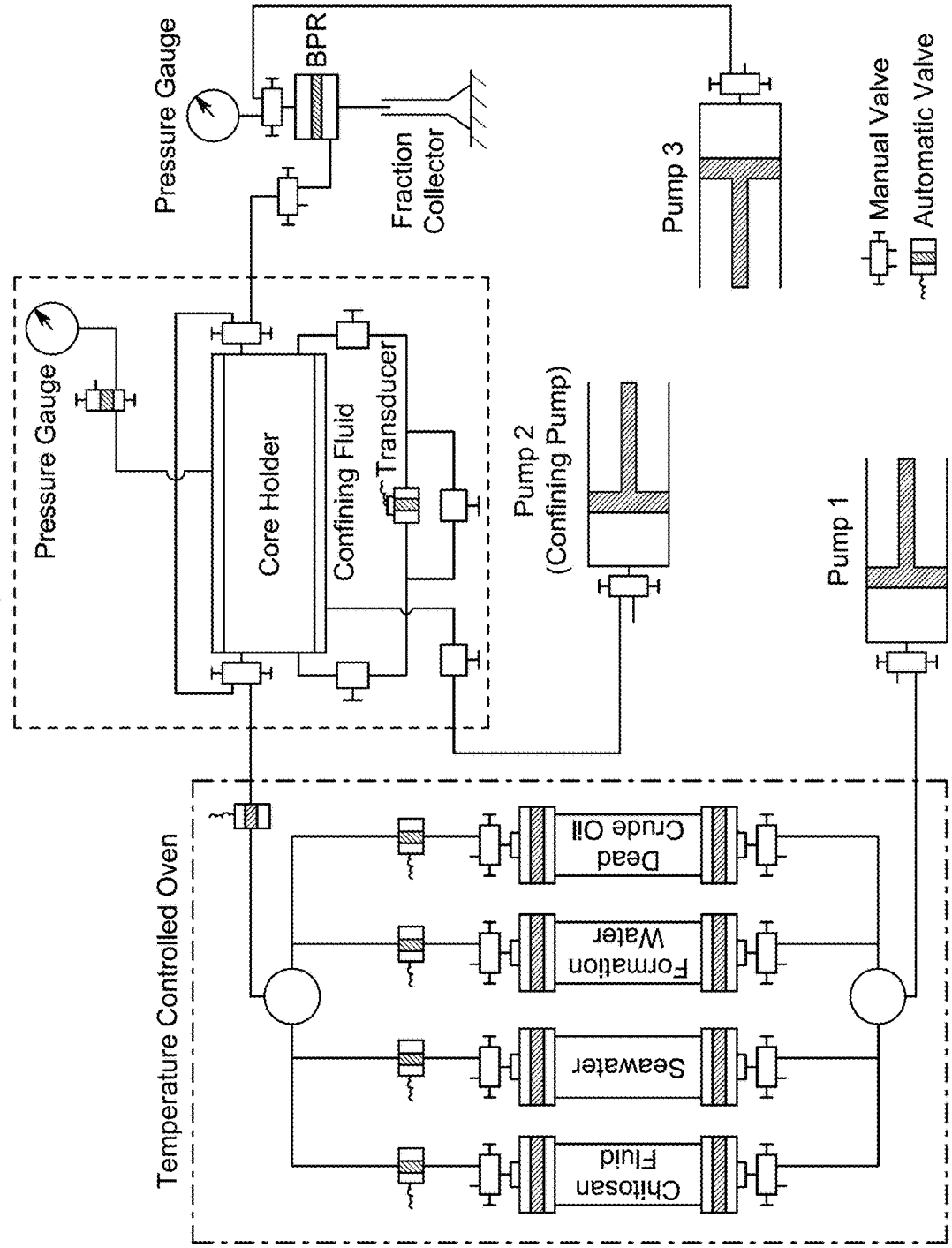
FIG. 5 is a schematic representation of the HTHP coreflood setup, according to certain embodiments.

FIG. 5 shows the schematic representation of the high-temperature high-pressure (HTHP) coreflood apparatus that was used in this disclosure. Three coreflood oil displacement studies were conducted to evaluate the efficiency of the chitosan salt polymer as a function of concentration, as shown in Table 4. Indiana limestone outcrop samples with the dimensions of 3" length and 1.5" diameter were used. The detailed petrophysical property of the sample may also be found in Table 4. The clean core samples were first vacuum saturated in the formation water (240 kppm, equivalent to the resident brine concentration and composition) using the auto-saturator (offite, PCS 340 Core Saturator) and later, they were pressurized for 4500 psi and kept ideal for two days to provide the uniform saturation of samples including small pores (narrow throats, nano-, and dead-pores). Thereafter, the samples were loaded into the HTHP coreflood setup (Corelab, Tusla, USA), and the oil-saturation test was performed, where both the irreducible water saturation, $S_{wi}$ and initial oil saturation, $S_{oi}$ were obtained. Later, the samples were unloaded and aged by soaking in an oil container for two weeks to shift their wettability towards oil-wet to represent the wettability of the reservoir. After that, one of the aged oil-wet core sample was loaded into the core holder and the required temperature and pressure (i.e., 100° C., 4500 psi overburden, 3200 psi back pressure) were set. Subsequently, the sample was flushed with fresh crude oil [at 0.1 cubic centimeters per minute (cc min$^{-1}$) for about 2 pore volume (PV)] for some time to remove the over-deposition of asphaltene/resin moieties. During this step, the effective oil permeability was also measured. With the continuous oil injection at 0.1 cc min$^{-1}$, it was left ideal for at least 4 to 6 hours to reach out the stable equilibrium condition of temperature and pressure. Later, the lines were cleaned thoroughly, and seawater flooding was initiated to mimic secondary oil recovery, once the 99% water-cut was reached, the chemical (chitosan fluid) injection was used, and its oil recovery performance was evaluated.

TABLE 4

List of coreflood oil displacement studies performed in this disclosure.

| Sample ID | Porosity (%) | K (mD) brine$_{fw}$ | K (mD) oil$_{swi}$ | Chitosan conc. in SW (ppm) | $S_{wi}$* (±0.25%) | Oil recovery increment (ORI, % OOIP*) SW | Oil recovery increment (ORI, % OOIP*) Chitosan | Total Recovery (%) |
|---|---|---|---|---|---|---|---|---|
| S7 | 15.1 | 38.9 | 11.2 | 10 | 21.4 | 37.8 | 10.5 | 48.3 |
| S8 | 15.3 | 38.6 | 10.8 | 100 | 21.2 | 36.1 | 14.7 | 50.1 |
| S9 | 15.2 | 39.1 | 11.1 | 1000 | 20.7 | 38.1 | 7.7 | 45.8 |

*$S_{wi}$ = irreducible water saturation, OOIP = Original oil in place.

Example 7: Polymer Synthesis and Characterization

Figure 6A:
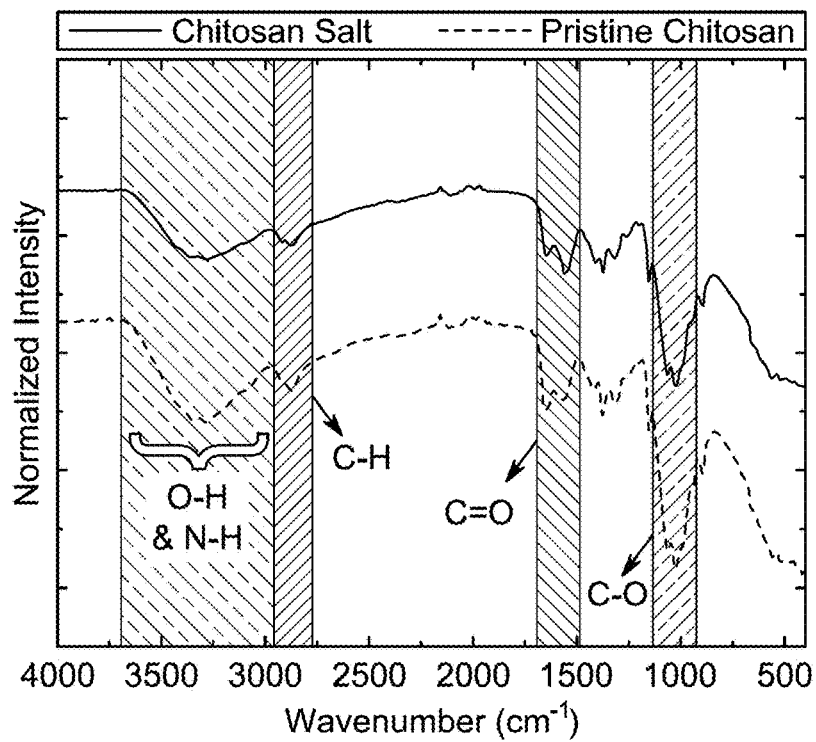
FIG. 6A depicts characterization of chitosan salt polymer using Fourier-transform infrared (FTIR) spectroscopy, according to certain embodiments.

Chitosan salt polymer was prepared by stirring chitosan in distilled water in the presence of acetic acid at room temperature for 72 hours. At the beginning, the solution was insoluble in water and upon the salt formation the solubility increased gradually. After 72 hours, the reaction mixture turned into a clear solution, indicating total solubility due to partial conversion of —NH$_2$ groups into NH$_3^+$, which enhances its water solubility. The conversion of chitosan to its corresponding salt improved the water solubility without affecting the chemistry of the polymer. FTIR confirmed that no structural changes were noticed in FIG. 6A. The —OH and —NH adsorption bands were found as broad peak at 3000 cm$^{-1}$-3750 cm$^{-1}$, while the adsorption bands at 2840 cm$^{-1}$-2955 cm$^{-1}$ were accredited to —CH$_2$ presented in the cycloaliphatic units of chitosan. Additionally, the adsorption bands of C=O and C—O were found at 1500 cm-1700 cm$^{-1}$ and 950 cm$^{-1}$-1120 cm$^{-1}$, respectively.

Figure 6B:
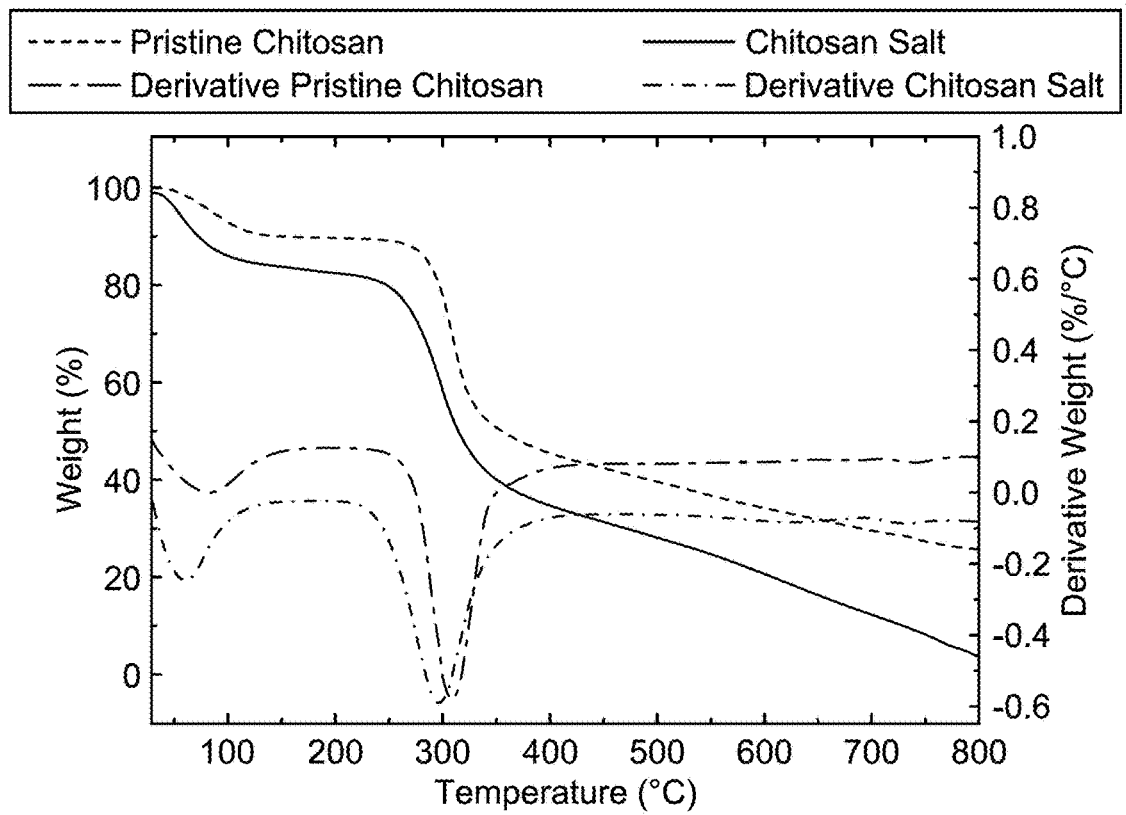
FIG. 6B depicts characterization of chitosan salt polymer using thermogravimetric analysis (TGA), according to certain embodiments.
Figure 6C:
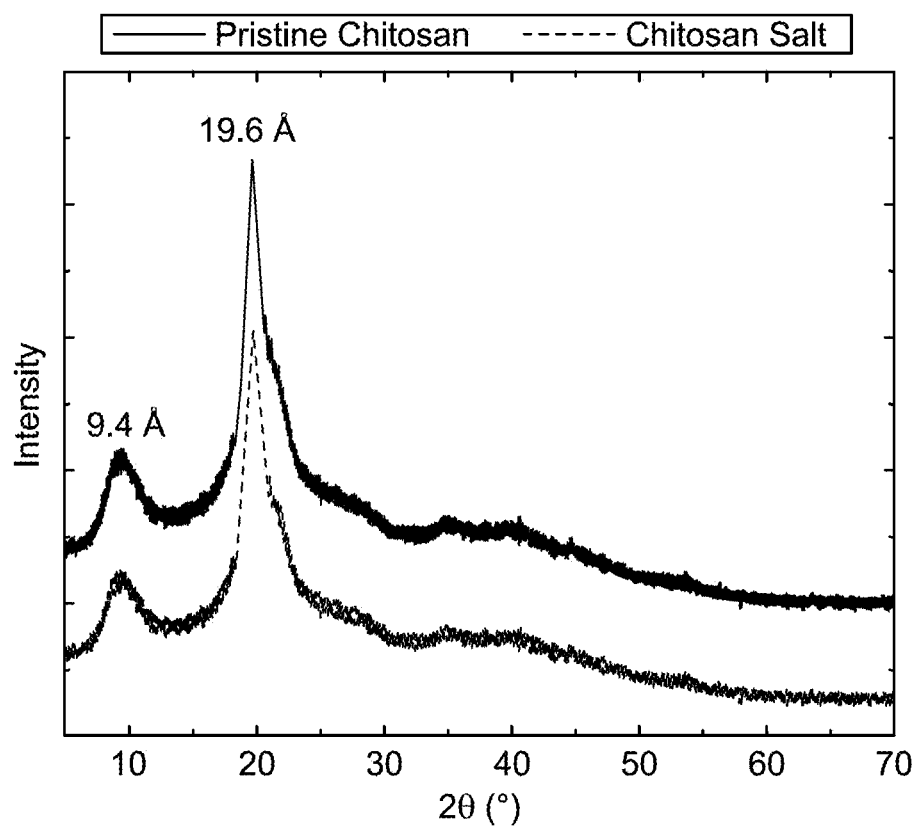
FIG. 6C depicts characterization of wide-angle X-ray diffraction (WXRD) patterns, according to certain embodiments.

Enhanced oil recovery applications require materials with good thermal stability that may remain stable under reservoir conditions. Therefore, the stability of the chitosan salt polymer was evaluated by thermogravimetric analysis (TGA) and plotted against the pristine chitosan polymer, as shown in FIG. 6B. Chitosan salt demonstrated slightly lower stability compared to the pristine chitosan. Both polymers showed two main thermal degradation steps, which are attributed to the decomposition of various functional groups at different temperatures. For instance, around 9% weight loss was observed at temperature below 100° C., due to the loss of water molecules adsorbed by chitosan. While the second thermal loss started around 250° C. caused by the thermal degradation of the cycloaliphatic rings, as previously reported [A. M. Kumar, T. Rajesh, I. B. Obot, I. I. Bin Sharfan, M. A. Abdulhamid, Water-soluble chitosan salt as ecofriendly corrosion inhibitor for N80 pipeline steel in artificial sea water: Experimental and theoretical approach, Int J Biol Macromol., 2024, 254, Pt 1, 127697]. Although the chitosan salt was relatively less thermally stable than the pristine polymer, it maintained good stability and excellent performance for corrosion inhibition. Furthermore, based on the thermal stability obtained from the TGA, the chitosan salt solution was subjected to a thermal test under reservoir conditions (i.e., 100° C. and 67 kppm) and exhibited good stability with no precipitation or sedimentation. Additionally, chitosan and its corresponding salt exhibited an amorphous morphology as perceived by the wide-angle X-ray diffraction (WXRD) analysis, as shown in FIG. 6C, with the two major peaks appearing at 2θ of 9.4° and 19.6°. This result indicates that converting chitosan to chitosan salt had no impact on its stability, morphology or structure, only improved its water solubility.

Example 8: Wettability Studies

Figure 7A:
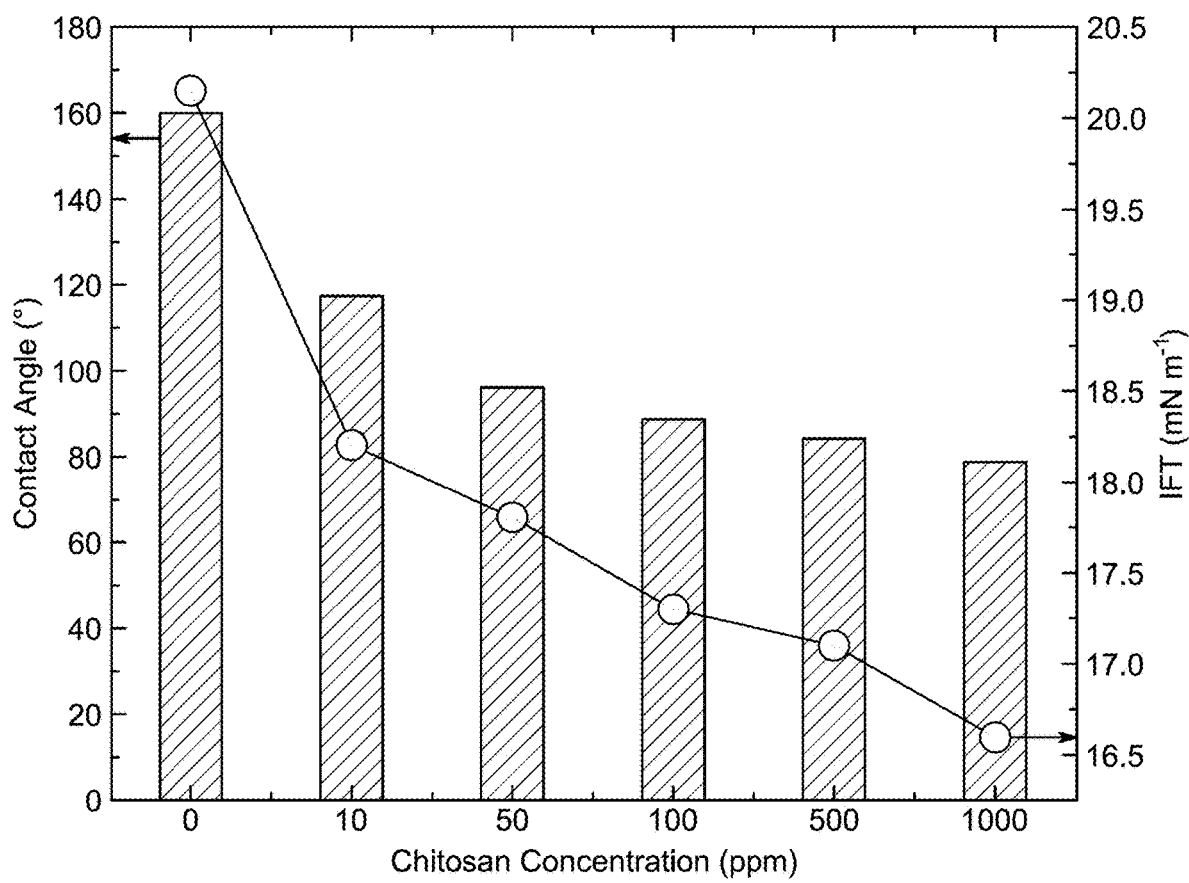
FIG. 7A depicts the effect of chitosan salt concentration on the rock wettability and interfacial tension (IFT), according to certain embodiments.
Figure 7B:
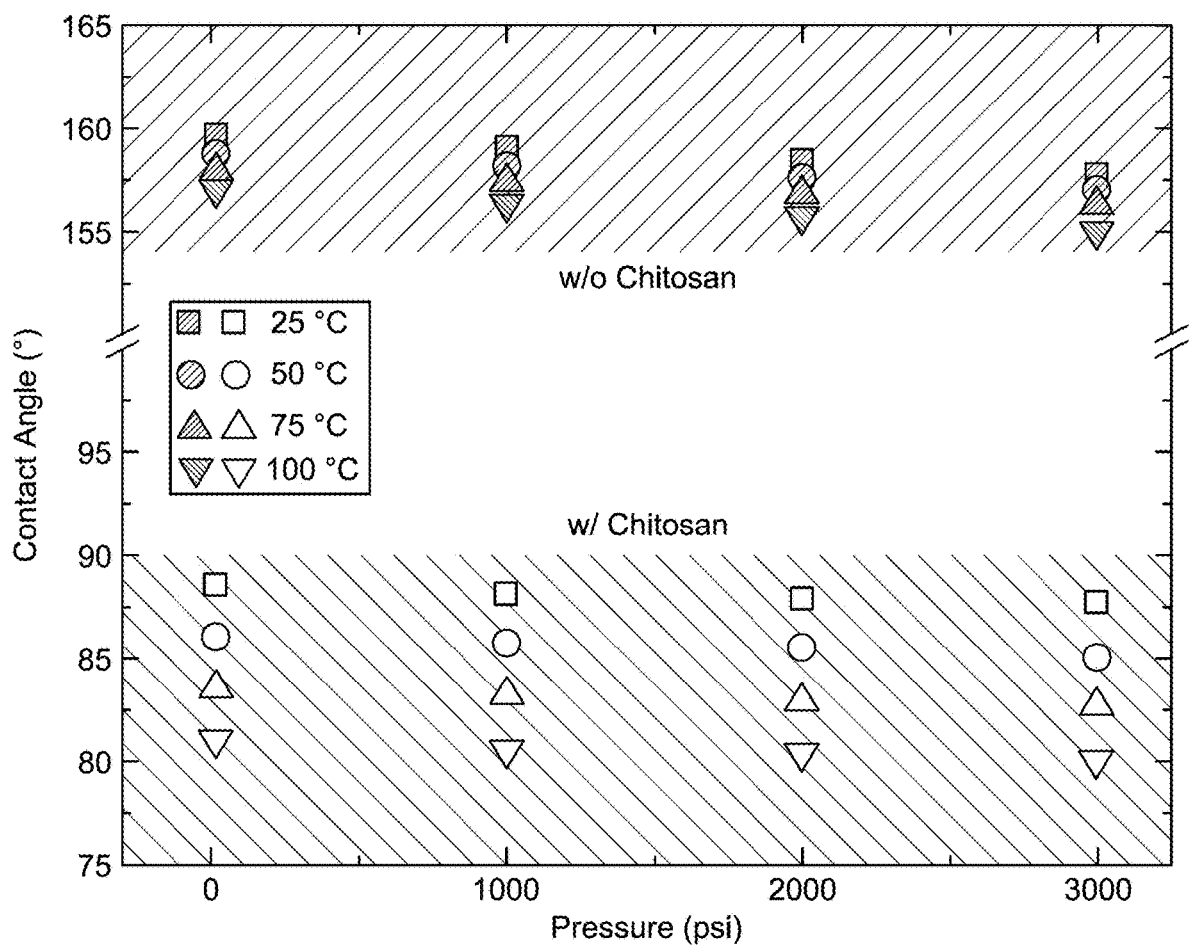
FIG. 7B depicts the temperature-pressure dependency of the rock-oil-seawater static wettability with (w/) and without (w/o) chitosan, according to certain embodiments.

FIGS. 7A-7B display the effect of chitosan salt polymer on the rock-oil-water wettability with different concentrations and at the ambient condition of 25° C. and 14.7 psi. Three different concentrations of 10 ppm, 100 ppm and 1000 ppm of chitosan salt solution were prepared in seawater (67 kppm). The carbonate samples originally demonstrated strong oil-wet characteristics as the measured contact angle was found to be ~160°, as shown in FIG. 7A. However, the addition of chitosan salt polymer-containing fluids was able to alter the wettability towards the mixed or intermediate wet. For instance, the use of 10 ppm chitosan solution displayed 25% reduction in the contact angle relative to the seawater. Further increase in the chitosan concentration (from 10 ppm to 1000 ppm) led to an increase in water wettability and thus decrease the contact angle. Further, at a concentration higher than 100 ppm, the changes in wettability were marginal. For example, increasing the concentration from 0 to 100 ppm demonstrated 47% reduction in contact angle, while increasing the concentration from 100 ppm to 1000 ppm displayed 10% reduction only. Overall, a nonlinear decrease in contact angle with an increase in concentration was observed. This shows that chitosan salt is most effective at relatively lower concentrations (≤100 ppm). It is worth mentioning that even at very low concentration (i.e., 10 ppm) chitosan salt has shown a contribution to modifying the oil-wet substrate into intermediate-wet, which is a requirement for the successful oil displacement in the LOR operation. In addition, the oil-water (SW) IFT at different concentrations of chitosan salt was also measured at the reservoir condition of 100° C. and 3000 psi, as shown in FIG. 7A. The addition of chitosan salt led to a reduction in oil-water interfacial tension (IFT). However, the reduction was very minor even at higher concentration (i.e., 1000 ppm) in which only 17% reduction was observed [from 20.15 millinewtons per meter (mN m$^{-1}$) to 16.6 mN m$^{-1}$]. Despite the little influence on the IFT, chitosan salt demonstrated a contribution in wettability modifications, which led to notable oil recovery performance.

To further investigate the effect of chitosan salt on wettability, the contact angle was measured at different temperatures and pressures to validate their efficacy in the Saudi reservoir formations. Chitosan salt solution at concentration of 100 ppm was selected and the contact angle was measured at temperature ranging from 25° C. to 100° C. and pressure ranging from 14.7 psi to 3000 psi, as shown in FIG. 7B. The increase in temperature and pressure had a marginally positive impact on wettability as they increased the water-wetness. However, the temperature effect is more dominant as the increment of pressure from 14.7 psi to 3000 psi reduced the contact angle by 1-2°, while the increase of temperature from 25° C. to 100° C. dropped the contact angle by 3°-8°. Interestingly, the best performance upon using chitosan salt was observed at 100° C. and 3000 psi, where the contact angle was reduced by 49% (from 158° to 80°), indicating that the chitosan salt has the potential to shift the wettability towards the water-wet, even in harsh conditions. However, this may also be explained by the reduction of viscosity of oil and oil-water IFT at higher temperatures, thus improving the relative permeability of the water phase. Similarly, it has been reported that the increase in temperature may change the carbonate rock surface charges to more negatively charged, which in fact may develop a repulsive force to the negatively charged oil that was adsorbed on the rock surface, thereby it increases the water-wetness in the reservoir [Mahani, H. et al., Insights into the impact of temperature on the wettability alteration by low salinity in carbonate rocks, energy and fuels, *Energy Fuels*, 2017, 31, 8, 7839-7853]. Additionally, the presence of amine groups (—NH$_2$) and hydroxyl groups (—OH) on the polymer backbone may have potential to chelate with $Ca^{2+}$ and $CO_3^{2-}$, respectively [He, W., et al., CaCO3-Chitosan Composites Granules for Instant Hemostasis and Wound Healing, *Materials* (*Basel*), 2021, 14, 12, 3350], and lead to higher adsorption on the surface of the carbonate rocks, which may result in an increase in water-wetness.

Example 9: Spontaneous Imbibition

Figure 8:
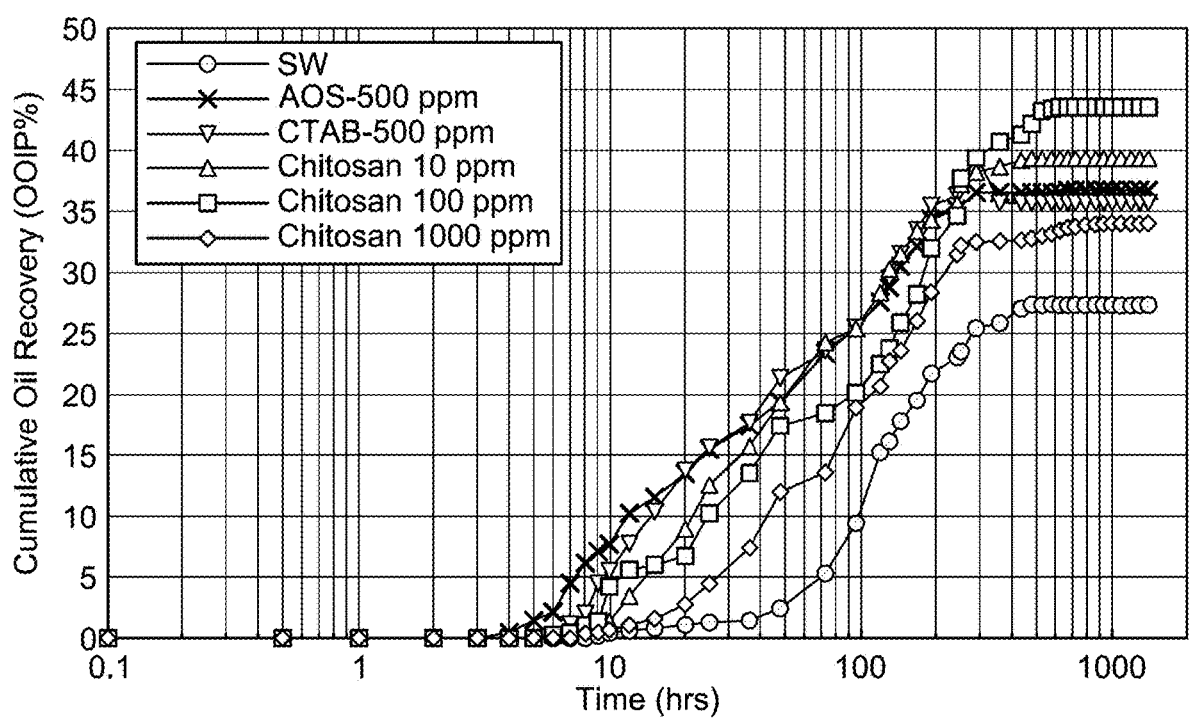
FIG. 8 depicts evaluation of chitosan salt polymer efficiency on the spontaneous imbibition on the oil-wet carbonate reservoir and its contribution to the oil displacements at 100° C. and 14.7 psi, according to certain embodiments.

FIG. 8 shows the effect of chitosan salt polymer, at different concentrations, on the spontaneous imbibition of the oil-wet carbonated reservoir and its contribution to oil recovery performances, as shown in Table 5. All tests were performed at 100° C. and 14.7 psi for two months using the same source of sister rocks (Indiana limestone outcrops). As a benchmark experiment, an imbibition test using seawater (S1) was evaluated. Afterwards, three different concentrations of chitosan salt solution (i.e., 10 ppm, 100 ppm, and 1000 ppm) in seawater were tested (S4-S6). Additionally, two conventional surfactants (i.e., AOS and CTAB) were used at a fixed concentration of 500 ppm in SW solution as a reference.

Imbibition tests using seawater as a fluid displayed a total recovery of 27.3% based on its original oil in place (OOIP). Additionally, it demonstrated a very slow onset recovery as it took almost 24 hours for producing the first drop of the oil and 480 hours (20 days) to reach the plateau, as shown in FIGS. 7A-7B. However, in the presence of commercial surfactants (CTAB or AOS) at 500 ppm the recovery increased by approx. 9% (from 27.3% to 35.7%-36.7%) relative to seawater. The additional recovery increase in the case of surfactants may be attributed to their function in lowering the surface tension between oil and water. Notably, chitosan salt fluids demonstrated higher oil recovery at lower concentrations compared to the commercial surfactants. For instance, S4 displayed a 12% of oil recovery increment which is 27%-38% higher than the increment achieved by AOS and CTAB at 500 ppm. Furthermore, S5 demonstrated an oil recovery increment of 16.2%, which is 72%-93% higher than AOS and CTAB. This indicates that the solely green chitosan salt polymer has great potential to replace the commercial fossil-based surfactants and use at very low concentration.

On the other hand, chitosan salt fluid showed a non-monotonic trend of oil recovery resulting from the increased concentration, unlike the wettability results. For instance, S4 and S5 exhibited a recovery of 39.3% and 43.5%, respectively, while S6 showed a notable drop to 33.9%. Furthermore, the onset recovery and plateau for S4 and S5 was found to be faster relative to S6 which took 868 hours (36 days) to reach the plateau. This shows that the chitosan salt polymer is more effective at lower concentration, which may be due to its poor stability at higher concentration resulting from potential agglomeration, strong interactions between the polymer chains, or enhanced viscosity.

TABLE 5

Imbibition fluids, concentrations and oil recovery performance.

| Sample ID | imbibition fluid | Concentration (ppm) | Oil recovery increment (% OOIP) | Total recovery (%) |
|---|---|---|---|---|
| S1 | SW | — | — | 27.3 |
| S2 | AOS | 500 | 9.4 | 36.7 |
| S3 | CTAB | 500 | 8.4 | 35.7 |
| S4 | Chitosan | 10 | 12 | 39.3 |
| S5 | Chitosan | 100 | 16.2 | 43.5 |
| S6 | Chitosan | 1000 | 6.6 | 33.9 |

Figure 9A:
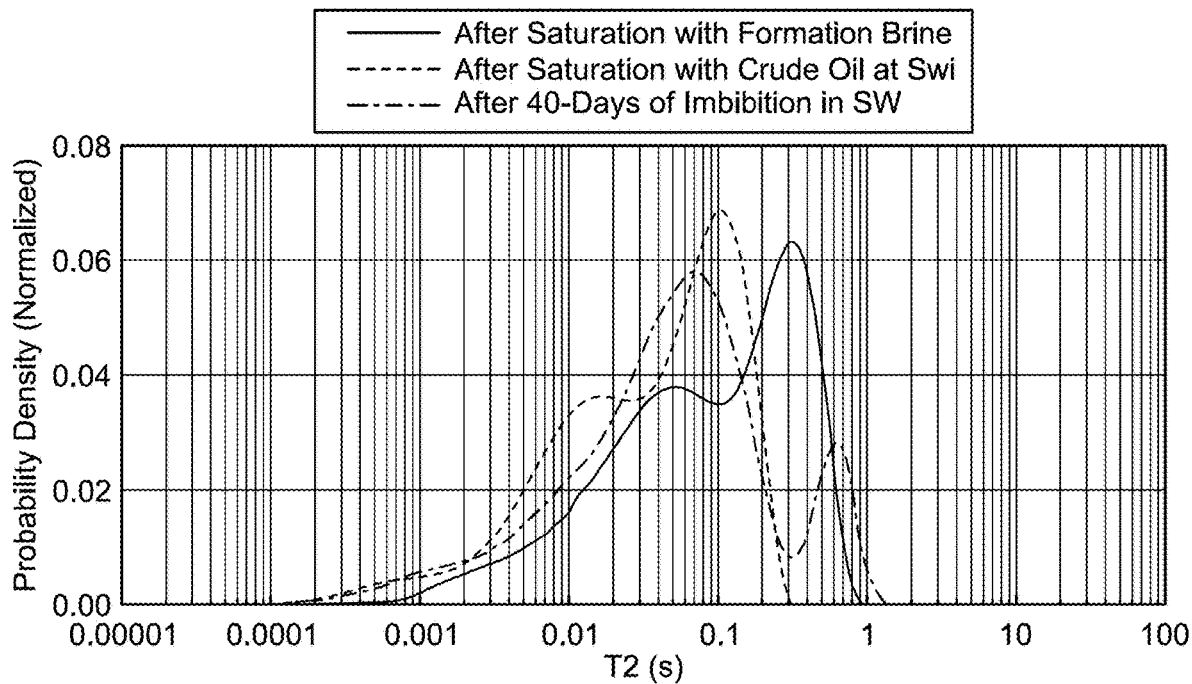
FIG. 9A depicts $T_2$ distribution of samples S1 [sea water (SW) only] at different stages of the imbibition tests, according to certain embodiments.
Figure 9B:
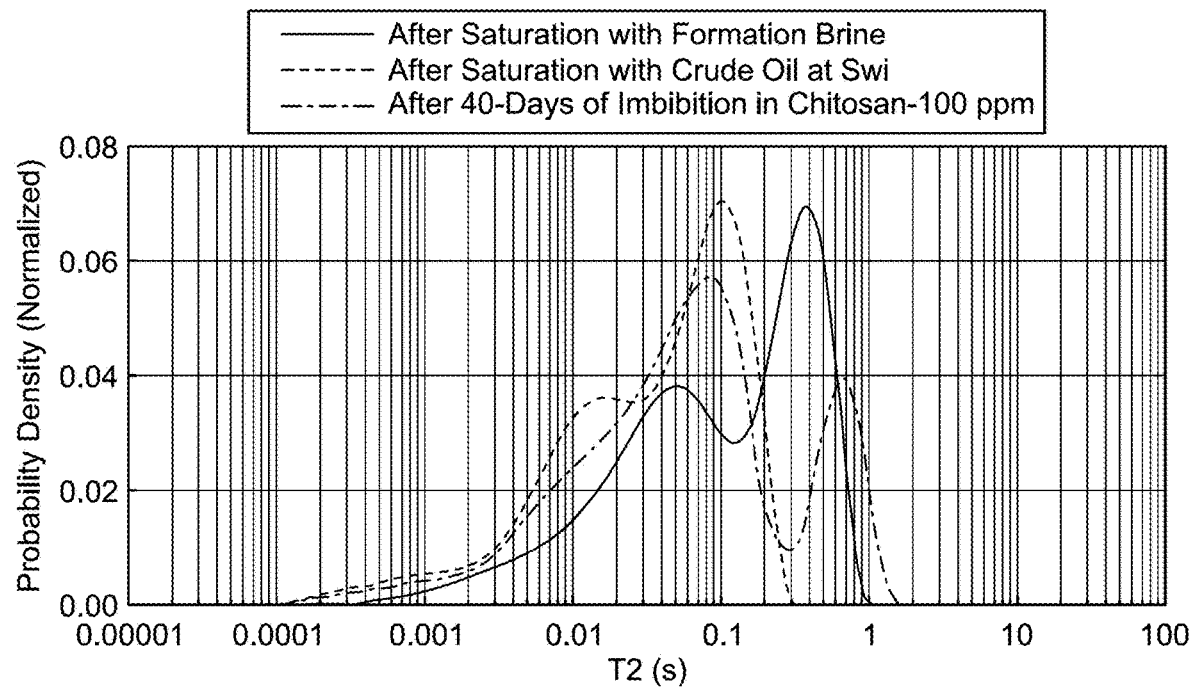
FIG. 9B depicts $T_2$ distribution of samples S2 (100 ppm chitosan salt in SW) at different stages of the imbibition tests, according to certain embodiments.

Subsequently, low-field NMR experiments were used to measure the $T_2$ distribution of imbibing fluids, S1 and S5, to understand the real fluid distribution through the rock pores, which may be further correlated with wettability changes, as shown in FIGS. 9A-9B. The $T_2$ distribution measurements were collected at different stages as following: (i) after saturating the rock sample with formation brine, (ii) after saturating the sample with crude oil at $S_{wi}$, (iii) after 40-days of spontaneous imbibition in their corresponding test fluids. The initial $T_2$ measurement of the brine-saturated sample may be used to understand the pore size representation of the rock samples. The brine-saturated sample demonstrated multimodal pore size distribution with two major peaks at higher $T_2$ and one minor peak at lower $T_2$, as shown in FIG. 9A. Generally, the pore sizes of the samples may be acquired from their corresponding $T_2$, where the appearance of peaks in the region of 0.1-1 s, 0.001-0.1 s, and 0.0001-0.001 s may be classified as macropores, mesopores, and micropores, respectively [Sakthivel, S., et al., Spontaneous imbibition characteristics of carbon nanofluids in carbonate reservoirs, *Energy Reports*, Volume 7, 2021, pages 4235-4248; Sakthivel, S., et al., Enhanced oil recovery by spontaneous imbibition of imidazolium based ionic liquids on the carbonate reservoir, *Journal of Molecular Liquids*, Volume 340, 2021, 117301]. As it may be estimated from the $T_2$ curve, the rock sample exhibited about 60%-62% of its pores as macropores, 39%-40% as mesopores and only 0.5%-1.5% as micropores. Overall, this multimodal distribution is the combination of intergranular, intragranular, and marginal pore systems [Lai, J., et al., Investigation of pore structure and petrophysical property in tight sandstones, Marine and Petroleum Geology, Volume 91, 2018, pages 179-189; Dillinger, A., et al., Experimental evaluation of reservoir quality in Mesozoic formations of the Perth Basin (Western Australia) by using a laboratory low field nuclear magnetic resonance, *Marine and Petroleum Geology*, Volume 57, 2014, pages 455-469]. Furthermore, after the crude oil saturation at $S_{wi}$ the curve shifted towards lower $T_2$, indicating that the entire pore systems were filled with the viscous fluid (i.e., crude oil), which induces faster relaxation due to their increased intramolecular interactions, resulted from increased viscosity, and oil-rock interactions, unlike the brine-rock system. After 40 days, the $T_2$ distribution was measured after finishing the spontaneous imbibition tests with the corresponding imbibing fluids (i.e., SW and chitosan-100 ppm). Interestingly, a new peak at higher $T_2$ has appeared, indicating that the imbibing fluids were invaded into the larger pores of the system. However, it is notable that the invasion of SW into the oil-wet rock matrix after 40 days of the imbibition test is relatively lower compared to the chitosan solution, as shown in FIG. 9B. This indicates that the chitosan system alters the wettability more in the macropores of the system. However, the performance of chitosan is very similar to the SW in the case of meso- and micropore systems as it has no notable impact on altering the wettability in such pores. Despite there being a slight change in mesopores in both the SW and chitosan, their overall contribution to oil recovery is limited, and remains oil-wet or less oil-wet. The micropore system was observed to have no changes at all in the SW case, while for chitosan a minor change was observed. This indicates that some micropores undergo some wettability modifications and thus the oil displacements occurred most likely from the macropores, irrespective of the imbibition fluids.

Example 10: Coreflood Oil Displacement

Figure 10:
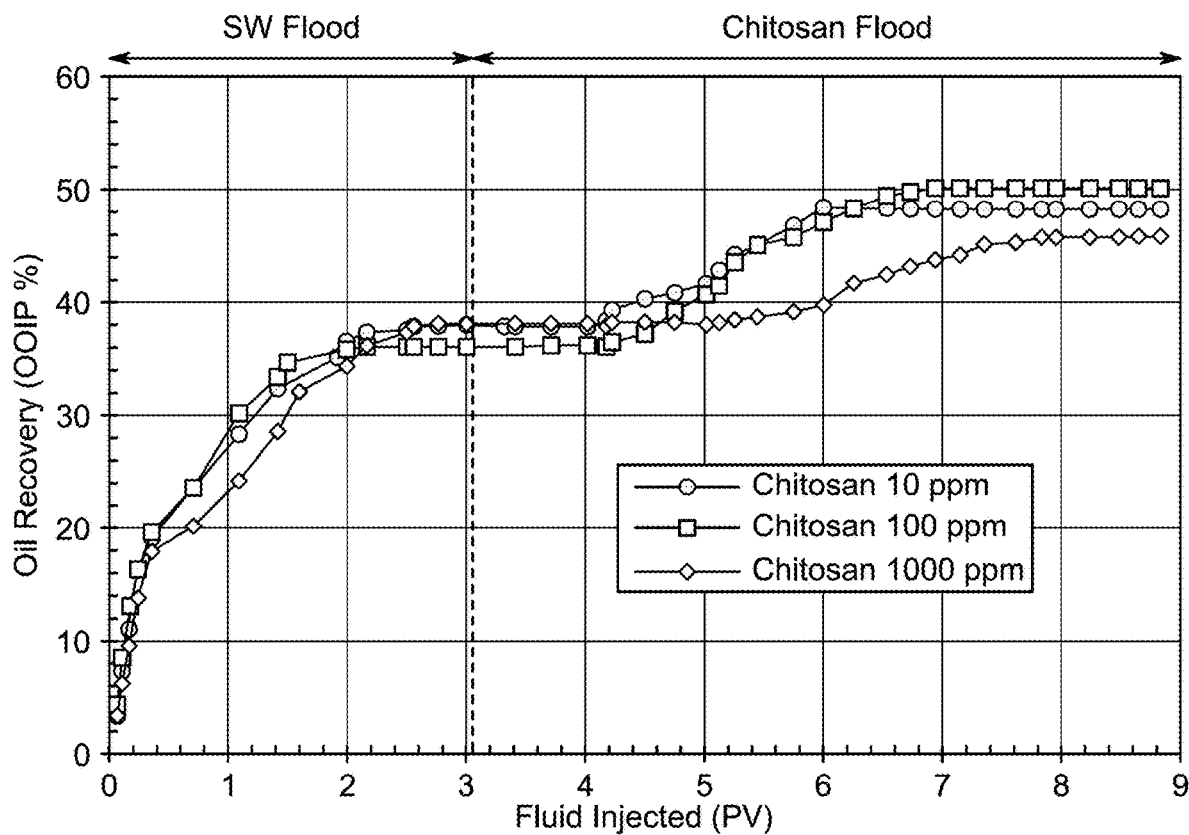
FIG. 10 depicts a coreflood oil recovery performance of chitosan salt polymer at different concentrations, according to certain embodiments.

To further evaluate the performance of the chitosan salt for enhanced oil recovery in the carbonate reservoir, coreflooding experiments were conducted as shown in FIG. 10. All these tests were performed at a temperature of 100° C. and a pressure of 4500 psi, to mimic the realistic reservoir environment. Three different concentrations of chitosan salt (i.e., 10 ppm, 100 ppm, and 1000 ppm in SW) were screened. Initially, all experiments were started with SW flooding to represent the conventional waterflooding, followed by the chemical injection, using chitosan salt at a specific concentration, once there is no more oil produced by SW injection. About 36%-38% of the oil was produced with the injection of 2 PV-3 PV of SW. Also, it is to be observed that the rate of recovery of the oil seemed to be relatively faster and reached the early plateau as it is thought to displace the oil mostly from the well-connected larger pores. However, the SW injection indeed leaves a sizeable amount of oil in the reservoir (as a residual fraction) due to their high capillarity, and it is thought to be left mostly in the meso- and micropores. However, the addition of chitosan salt in SW increased the oil recovery by 8%-14%. Notably, the coreflooding experiments demonstrated similar behavior to the imbibition tests, in which chitosan solution at low concentration (≤100) exhibited better performance relative to higher concentration solutions. For example, at 10 ppm and 100 ppm of chitosan salt solution an incremental recovery of 10.5% and 14%, respectively, was observed. However, increasing the concentration to 1000 ppm resulted in only a 7.7% increase. Additionally, the rate of recovery was more pronounced at lower concentrations as their onset recovery is relatively faster and it reached the plateau earlier. While at higher concentrations, a slower oil displacements process was observed, and reached the plateau only after 5 PV. The imbibition and coreflooding experiments confirm that chitosan salt polymer is most effective at lower concentrations, which may be the result of better solubility and little agglomeration or precipitation relative to the high concentration samples. Furthermore, the coreflooding experiments demonstrated the potential of utilizing only the green chitosan salt for enhanced oil recovery applications, as an alternative for commercially available fossil-based surfactants and polymers.

Figure 11:
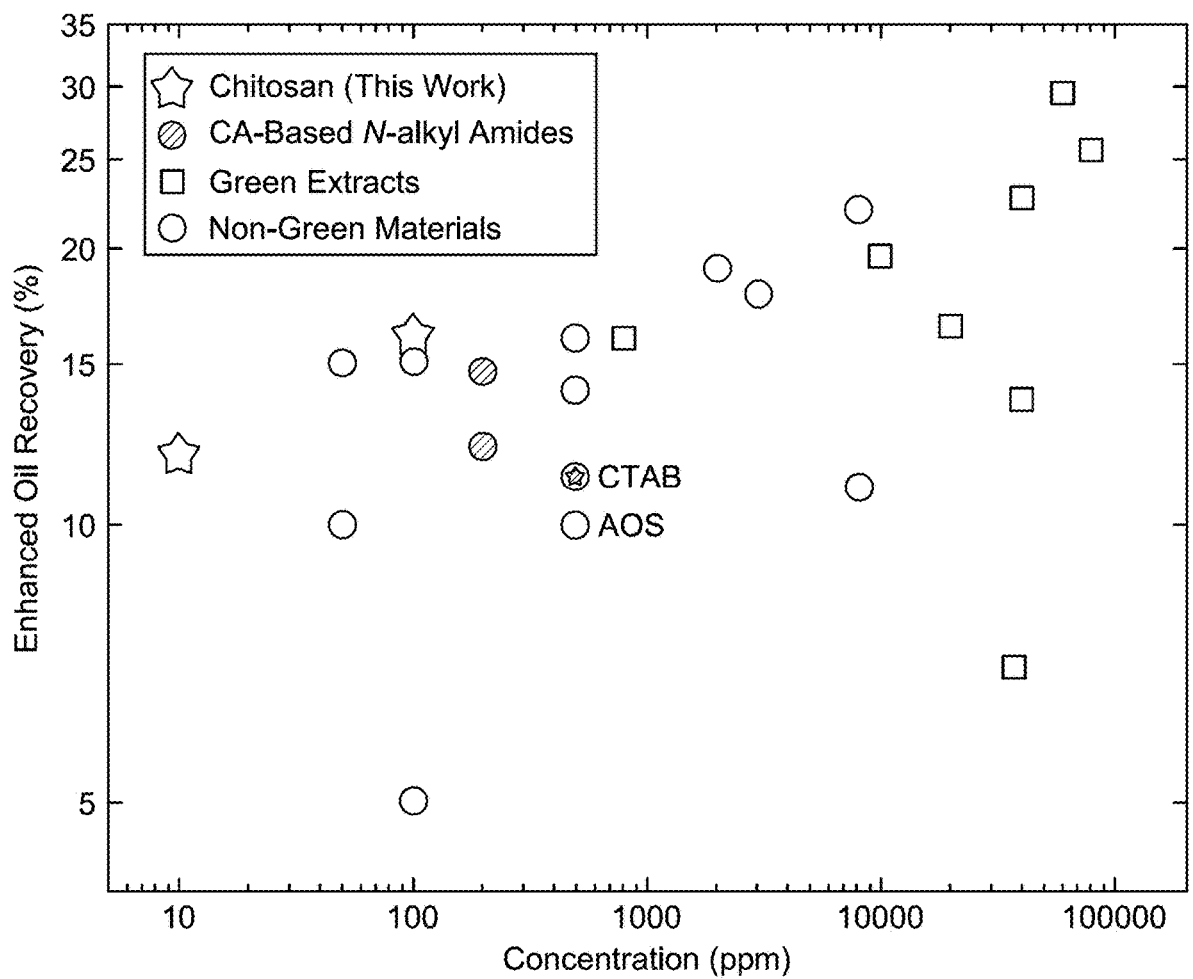
FIG. 11 depicts comparison of chitosan salt oil recovery performance relative to previously reported materials, according to certain embodiments.

To further evaluate the performance of the chitosan salt in enhanced oil recovery applications, its performance relative to previously reported green extracts, fossil-based materials, and commercial surfactants were compared and presented in FIG. 11. It is worth mentioning that, for industrial applications, the target zone may be located at the top-left corner of the graph, as shown in FIG. 11, representing low concentration and high recovery performance. Notably, some graphene-based materials demonstrated good oil recovery performance ranging between 10% and 15% at a concentration between 50 ppm and 100 ppm [Luo, D., et al., Nanofluid of graphene-based amphiphilic Janus nanosheets for tertiary or enhanced oil recovery: High performance at low concentration, *Proc Natl Acad Sci*, 2016, 113, 28, 7711-6]. However, the newly developed chitosan salt was able to achieve a similar performance of 12% at 5 to 10-fold lower concentration (i.e., 10 ppm). Additionally, at 100 ppm the chitosan salt displayed higher recovery relative to all previously reported graphene-based materials. On the other hand, green extracts showed great potential to enhance the oil recovery by 30% but at a very high concentration of 100,000 ppm [S. Sakthivel, Z. A. AlDhawi, M. A. Abdulhamid, Citric acid-based N-alkyl amides for enhanced oil recovery application in the carbonate reservoir: Sustainable laboratory-scale synthesis and recovery performance], and this may minimize the industrial interest due to the high cost resulted from injecting high concentrations.

Furthermore, CTAB and AOS, two commonly used fossil-based surfactants for oil recovery, displayed an enhanced oil recovery performance of 8.4% and 9.4%, respectively, at 500 ppm. However, the solely green chitosan salt demonstrated an enhanced oil recovery of 16.2%, which is 93% and 72% higher than the recovery obtained from CTAB and AOS, respectively, at a five times less concentration of 100 ppm. The obtained results show that the newly developed chitosan salt is not only green and sustainable, but its performance may surpass the synthetic surfactants even at very low concentrations. This paves the way to increase focus on developing sustainable materials for upstream applications which may improve performance while minimizing the environmental hazard resulting from scaling up fossil fuel-based materials.

In the disclosure, a solely green and sustainable water-soluble chitosan salt polymer was prepared and utilized for enhanced oil recovery in the carbonate reservoir. The polymer demonstrated excellent solubility in distilled and saline water at concentrations between 10 ppm and 1000 ppm. The wettability of the oil-wet rock samples was altered from strongly oil-wet into the water-wet (from 1600 to 88°) with a concentration of 100 ppm. The chitosan salt resulted in a maximum cumulative oil recovery of 43.7% with excellent stability under reservoir conditions. The NMR studies showed that the presence of chitosan salt may help in recovering the oil displaced in the meso- and micropores area as noticed from the shifts in the relaxation time ($T_2$). Additionally, coreflooding experiments displayed similar recovery performance relative to imbibition tests, indicating the reproducibility of the chitosan performance. Furthermore, the chitosan salt displayed excellent performance compared to previously reported green extracts which only performed at extremely high concentrations. Moreover, the newly developed chitosan salt recovery performance exceeds the performance observed by CTAB and AOS even at very low concentrations. This study shows the potential of replacing synthetic surfactants with green and sustainable materials with improved performance, lower $CO_2$ emissions, and limited environmental impact. The disclosure demonstrated 90% higher oil recovery compared to AOS with an eco-friendly polymer. Furthermore, the chitosan salt provides improved enhanced oil recovery performance in carbonate reservoirs.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of recovering oil from a subterranean geological formation, comprising:
    injecting a solution comprising salt water and a chitosan acetate salt polymer into the subterranean geological formation; and
    concurrently recovering oil from a production well in the subterranean geological formation,
    wherein the chitosan acetate salt polymer has a structure according to the formula

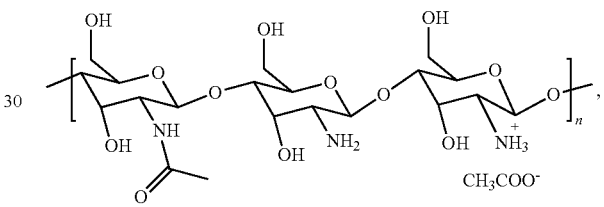

wherein the chitosan acetate salt polymer alters the wettability of the subterranean geological formation,
    wherein the concentration of chitosan acetate salt polymer in the solution is in a range from 1 to 1,000 ppm, and
    wherein the contact angle of the solution on a formation surface is reduced by greater than or equal to 25% compared to a solution consisting of the salt water.

2. The method of claim 1, wherein the concentration of chitosan acetate salt polymer in the solution is in a range from 10 to 1,000 ppm.

3. The method of claim 2, wherein the concentration of chitosan acetate salt polymer in the solution is in a range from 50 to 350 ppm.

4. The method of claim 3, wherein the concentration of chitosan acetate salt polymer in the solution is in a range from 75 to 150 ppm.

5. The method of claim 4, wherein the concentration of chitosan acetate salt polymer in the solution is 100 ppm.

6. The method of claim 1, wherein the contact angle of the solution on a formation surface of the subterranean geological formation is reduced by greater than or equal to 35% compared to a solution consisting of the salt water.

7. The method of claim 6, wherein the contact angle of the solution on a formation surface of the subterranean geological formation is reduced by greater than or equal to 45% compared to a solution consisting of the salt water.

8. The method of claim 7, wherein the contact angle of the solution on a formation surface of the subterranean geological formation is reduced by greater than or equal to 50% compared to a solution consisting of the salt water.

9. The method of claim 1, wherein the interfacial tension between the solution and a formation surface of the subterranean geological formation is reduced by greater than or equal to 40% compared to a solution consisting of the salt water.

10. The method of claim 9, wherein the interfacial tension between the solution and a formation surface of the subterranean geological formation is reduced by greater than or equal to 60% compared to a solution consisting of the salt water.

11. The method of claim 10, wherein the interfacial tension between the solution and a formation surface of the subterranean geological formation is reduced by greater than or equal to 80% compared to a solution consisting of the salt water.

12. The method of claim 11, wherein the interfacial tension between the solution and a formation surface of the subterranean geological formation is reduced by greater than or equal to 90% compared to a solution consisting of the salt water.

13. The method of claim 1, wherein the solution has a total oil recovery of greater than or equal to 30% in a spontaneous imbibition test using an oil-wet carbonate reservoir rock sample.

14. The method of claim 13, wherein the solution has a total oil recovery of greater than or equal to 35% in a spontaneous imbibition test using an oil-wet carbonate reservoir rock sample.

15. The method of claim 14, wherein the solution has a total oil recovery of greater than or equal to 40% in a spontaneous imbibition test using an oil-wet carbonate reservoir rock sample.

16. The method of claim 15, wherein the solution has a total oil recovery of greater than or equal to 43% in a spontaneous imbibition test using an oil-wet carbonate reservoir rock sample.

17. The method of claim 13, wherein the oil-wet carbonate reservoir rock sample is Indiana limestone.

18. The method of claim 1, wherein the solution has an additional oil recovery of greater than or equal to 7% following saltwater displacement in a coreflood oil displacement test.

19. The method of claim 18, wherein the solution has an additional oil recovery of greater than or equal to 10% following saltwater displacement in a coreflood oil displacement test.

20. The method of claim 19, wherein the solution has an additional oil recovery of greater than or equal to 14% following saltwater displacement in a coreflood oil displacement test.

* * * * *